United States Patent [19]

Drake

[11] Patent Number: 4,638,562

[45] Date of Patent: Jan. 27, 1987

[54] EXTENSION HANDLES FOR HEDGE TRIMMERS

[76] Inventor: Tom Drake, 130 Harbor Rd., Rye, N.H. 03870

[21] Appl. No.: 832,793

[22] Filed: Feb. 26, 1986

[51] Int. Cl.$^4$ ............................................. A01G 3/04
[52] U.S. Cl. ..................................... 30/296 R; 30/340
[58] Field of Search ................ 30/296 R, 296 A, 122, 30/381, 340

[56] References Cited

U.S. PATENT DOCUMENTS

| | | |
|---|---|---|
| 2,417,620 | 3/1947 | Soderberg . |
| 2,832,136 | 4/1958 | Trecker . |
| 3,291,167 | 12/1966 | Varden ................................. 30/122 |
| 3,346,955 | 10/1967 | Beneke ............................. 30/296 R |
| 3,657,813 | 4/1972 | Knight .............................. 30/296 R |
| 3,731,380 | 5/1973 | Mathlesen . |
| 3,838,508 | 10/1974 | Turner, Sr. ........................... 30/216 |
| 3,949,817 | 4/1976 | Rice ..................................... 30/381 |
| 4,145,810 | 3/1979 | Belliston .......................... 30/296 R |
| 4,197,764 | 4/1980 | Auernhammer ....................... 30/340 |
| 4,207,675 | 6/1980 | Causey ............................. 30/296 R |
| 4,364,435 | 12/1982 | Tuggle ............................. 30/296 R |
| 4,463,498 | 8/1984 | Everts ............................... 30/296 R |
| 4,515,423 | 5/1985 | Moore ................................. 30/122 |

Primary Examiner—Jimmy C. Peters
Attorney, Agent, or Firm—Dowell & Dowell

[57] ABSTRACT

Electrical and gasoline operated hedge type trimmers having extension handle mounting assemblies which are either integrally formed with or which are securely and clampingly engaged to the motor housing of the trimmers so as to provide one or more secure supports by way of which the trimmers may be selectively or fixedly extended from elongated handles in order to enable the trimmers to be worked, held or manipulated to cut elevated or remote areas of hedges, plants, trees or other areas of vegetation.

20 Claims, 11 Drawing Figures

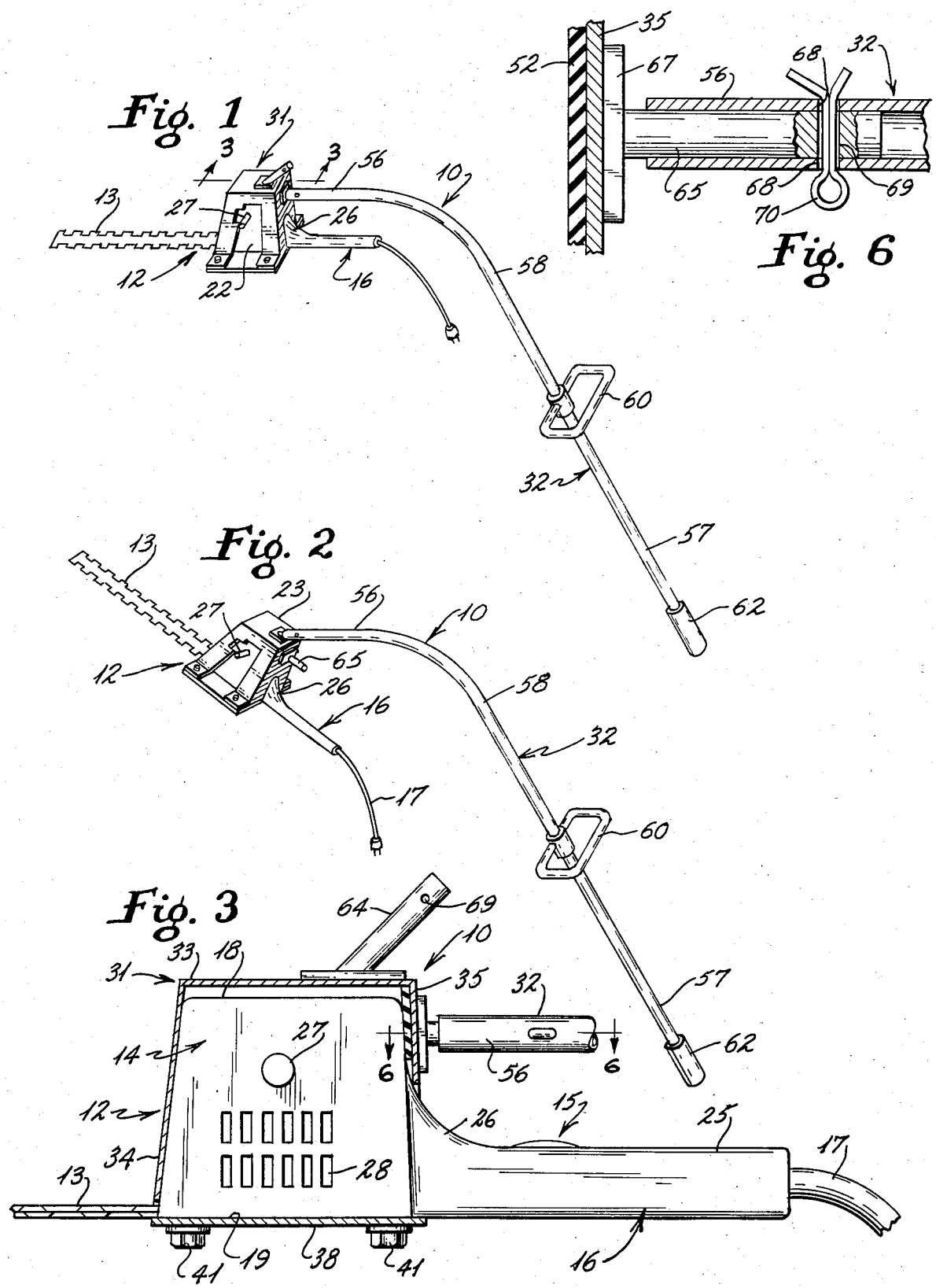

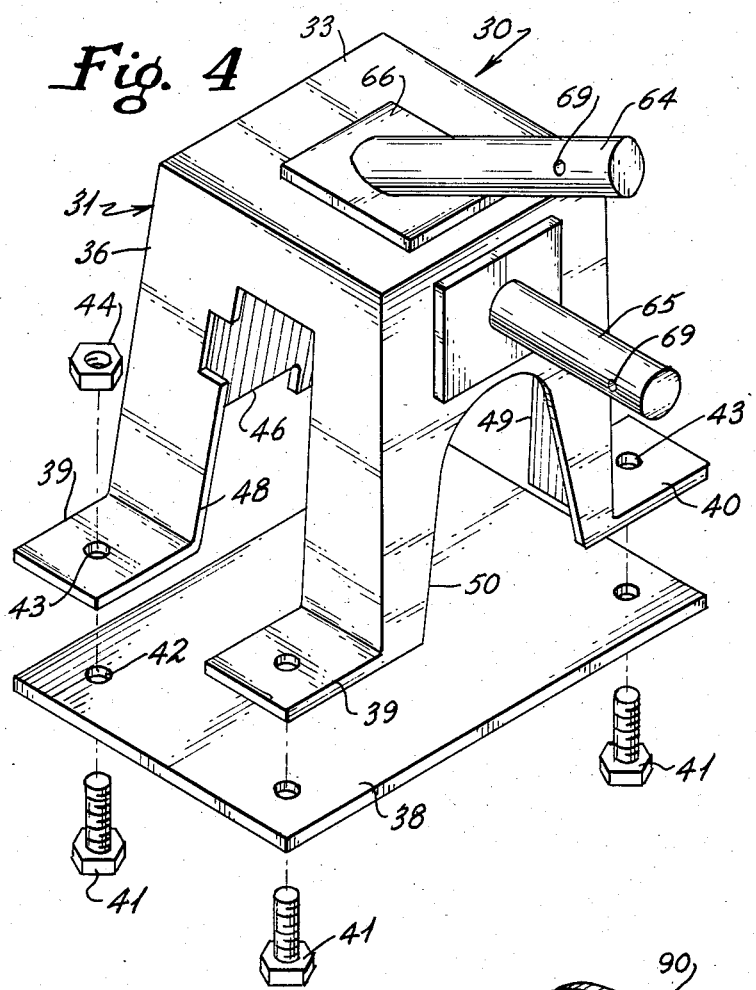
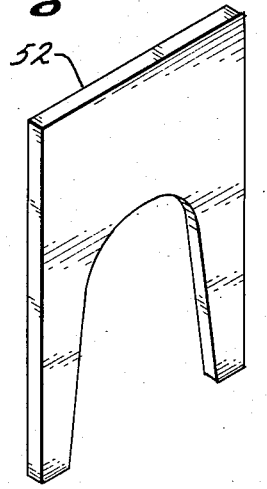
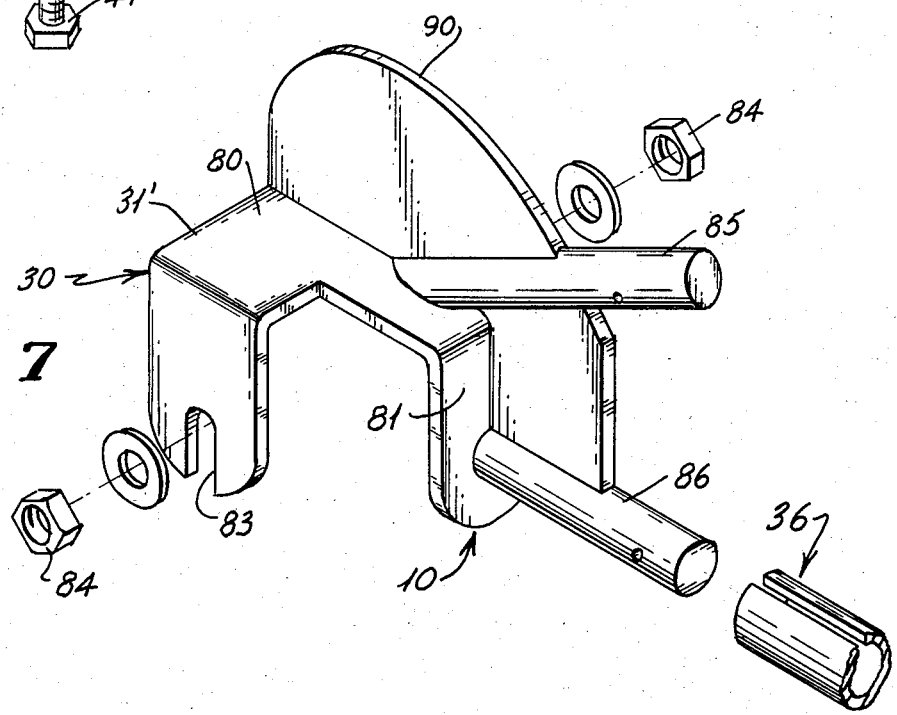

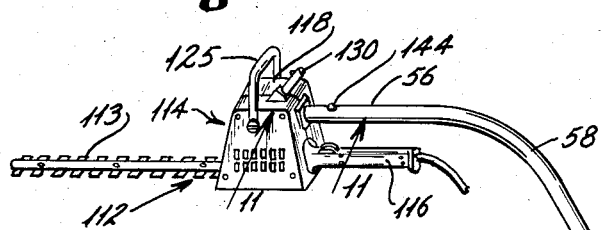
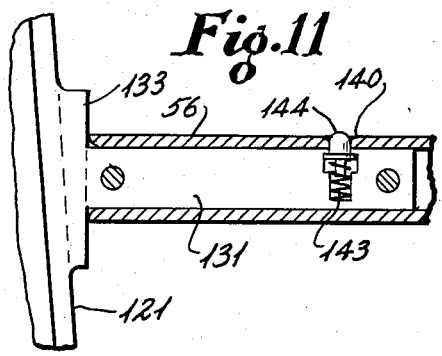
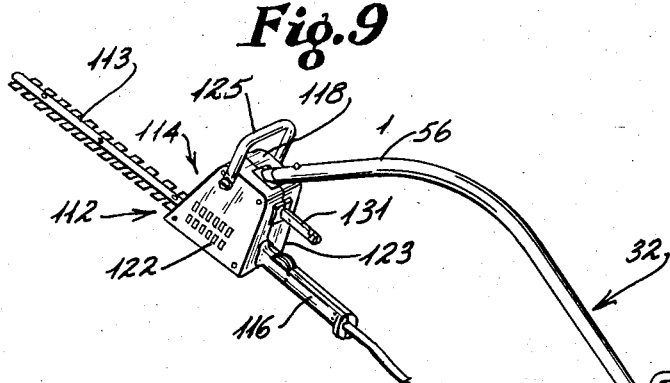
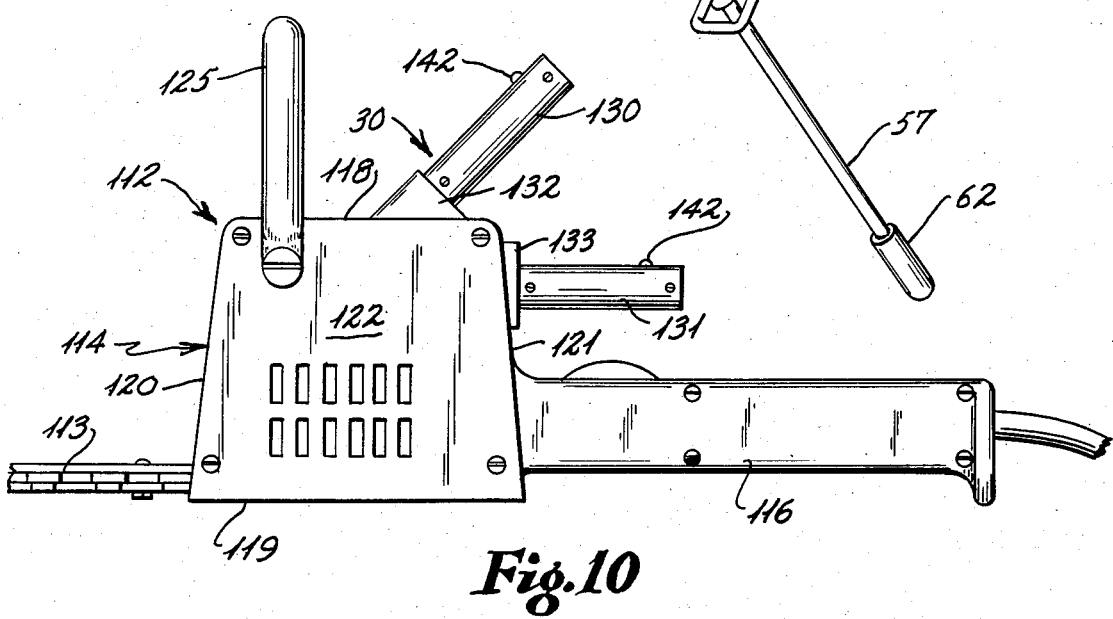

EXTENSION HANDLES FOR HEDGE TRIMMERS

BACKGROUND OF THE INVENTION

1. Field of the Invention

This invention is generally directed to safety devices for use with power tools and particularly to extension handles for use with gasoline or electrically operated hedge trimmers. The hedge trimmers include supplemental handle mounting assemblies which are either integrally formed or selectively and clampingly engaged with the motor housings of the trimmers and which assemblies enable the trimmers and which assemblies enable the trimmers to be selectively connected and rigidly supported by elongated handles in one of a selected number of positions thereby permitting the use of the hedge trimmers to cut either elevated or extended areas of vegetable growth. The invention permits alternative alignments between the elongated handles and the trimmer housings in order to allow the trimmers to be disposed at various fixed orientations with respect to the handle during operation.

2. History of the Art

Heretofore there have been numerous proposals for making the operation of various power tools more safe and more convenient for persons using such tools. Power tools which have been designed for use by the homeowner for lawn and garden upkeep have often proved to be extremely hazardous tools. Their use has resulted in injury and even dismemberment even when the person utilizing such tools has consciously utilized them with caution. Such power equipment as gasoline and electrically operated lawnmowers, chainsaws and hedge trimmers are inherently dangerous, and therefore, it is necessary to provide the utmost care in the design and operation of such equipment.

Unfortunately, the designers of home use tools do not always recognize the enumerable situations which may occur and which make the use of power tools extremely dangerous even in the hands of the most conscientious and experienced operators. In order to provide for increased user safety especially in the field of hedge trimmers for trimming hedge rows, plants, trees, bushes, brush and other vegetation areas, product manufacturers have begun utilizing control means which require that the operator's hand be positively placed on the operating switch in order to permit power to be applied to the cutting elements of the trimmers. In the event the operator should slip, fall or otherwise lose control of the trimmer, the automatic on/off mechanism theoretically operates to stop the trimmer and thereby prevent injury to the operator.

For some reason, the design of hedge trimmers has resulted in most conventional structures having a handle which is placed immediately to the rear of the hedge cutting elements thereby requiring that the hands of an operator be disposed immediately adjacent to the cutting elements during the use of the tools. As the cutting elements are so closely disposed to the body of the operator, accidents and injuries have occurred even though the control mechanisms are automatically designed to stop the operation of the power tool when the operator's hand is removed therefrom.

The danger of possible harm or injury from power tools is especially acute when considering that such tools as hedge trimmers have electrical cords which extend from motors which are mounted to the handle portions of the trimmers. Operators frequently find that the electrical cord has become trapped or cut by the reciprocating movement of the cutting blades of the trimmers. In order to decrease the potential for liability for the poor design of mounting a power cord so closely to the cutting elements of an outdoor power tool, some manufacturers have resorted to making the initial power connection immediately adjacent to the handle itself, i.e. the operating plug for the power tool is disposed within a foot of the handle thereby prohibiting it from being engaged by the cutting elements. However, when connecting an outdoor extension cable to the plug of the power tool, the outdoor extension cable or cord becomes a mere extension of the shortened power cord. Most accidents involving a cut electrical connector will therefore involve the extension cable which frequently becomes entwined in the brush or dangles so closely adjacent to the cutting elements of the hedge trimmer that the blades thereof can easily engage and severe the insulated housing or the conductors as the hedge trimmer is moved from side to side during use.

In addition to the foregoing, when dealing with fairly large hedge rows or large areas of vegetation, cutting tools such as hedge trimmers become extremely awkward and difficult to maneuver with one hand or one arm. Current hedge trimmer designs require that the hedge trimmers be suspended or held outwardly from the body of the user by a single hand, and therefore, it is easy for the operator to become fatigued and lose control or secure a grip on the tool. Therefore, even where safety devices are utilized, injury can be caused in the fraction of a second that it takes the hand of the operator to release a positive actuated switch which controls the operation of the cutter elements.

Most hedge trimmers are designed to be utilized in close vacinity to the operator. In this manner, the operating handle of conventional hedge trimmers restricts the amount of area which can be reached by the operator during the use of the tool. Frequently, hedge rows or other areas or plants which need trimming and can be trimmed utilizing hedge trimmers require cutting at heights which are elevated or at positions well above the operator or well to one side or the other of the operator. To reach such remote areas, operators of hedge trimmers must often place themselves in a precarious position in order to extend the power tool outwardly to effectively cut or trim such an area. The awkward manipulation of power tools only adds to the risk of possible injury from their use.

Several innovations have been proposed to make the operation of power tools and especially hedge trimmers more convenient for the operator. In U.S. Pat. No. 4,197,764 to Auernhammer, a detachable handle assembly is disclosed for supporting an electrically powered hedge trimmer at a position remote from the operator. The handle assembly is shown as being adjustably clamped to a base portion by a U-shaped mounting bolt so that the angle or pitch of the garden tool can be easily changed with respect to the handle. However, the amount of torque generated by especially large hedge trimmers makes it possible for such hedge trimmers to be rotated from their clamping engagement with the mounting assemblies thereby creating a situation where the handle is only loosely connected to the hedge trimmer or garden tool. In the event the tool should rotate free or slip from its adjusted position, the cutting blades could create an immediate hazard or danger to the operator or to a bystander. Further, such a frictioned or clamped connection could lead to the inadvertent cutting of vegetation in an area which is not desired to be cut due to the tool slipping from its proper engagement with the elongated handle. Also, the elongated handle of the Auernhammer patent is mounted to an extended portion of the shortened handle of the hedge trimmer. The handle portion of the hedge trimmer is the weakest area of the trimmer and normally is constructed of a plastic housing which is extended outwardly from a central portion surrounding the motor of the trimmer. Because of this construction, it is easy to fracture the area between the motor housing and the handle of the trimmer thereby creating a situation where the electrical connections could be exposed or the cutting elements of the power tool may pose a threat of serious injury to the operator or to a bystander.

In U.S. Pat. No. 3,838,508 to Turner, Sr., a hedge trimmer is disclosed having an elongated handle portion with control means mounted remote from the cutting elements. The elongated telescopically movable handle in Turner requires that the overall design of the conventional hedge trimmers be altered in order to permit the handle means to be connected thereto. Further, the linear orientation of the handle means disclosed in Turner does not permit the hedge trimmers or cutting elements of the hedge trimmers to be oriented at an angle or pitch with respect to the handle, and therefore, does not permit their use either at elevated or extended positions with respect to the operator. The patent discloses additional operating handles which are connectable to more conventional hedge trimmers. Such handles are shown as being generally linearly extended from the shortened handle normally extending from the motor housing of the hedge trimmers. In these instances, the handle is secured to the normal operating handle of the hedge trimmers and includes extendable portions which are also engagable with either a supplemental handle mounted to the motor housing of the hedge trimmers or underlying such motor housing. Again, the extendable handles disclosed do not permit any angular or pitched adjustment of the hedge trimmer with respect to the operator and therefore do not allow for the use of the hedge trimmers in elevated or extended positions wherein the angle between the operator and the area to be cut requires an angled displacement of the cutting blade relative to the operator. In addition, the structures disclosed do not provide a rigid attachment of a handle to the most secure portion of the hedge trimmers and thus may subject the operator to an undue or undesirable amount of vibration which can be adverse to the use of the tool.

Some other examples of lawn and garden power cutting tools are disclosed in U.S. Pat. No. 3,731,380 to Mathlesen which is directed to an extensible pole for use with chainsaws, U.S. Pat. No. 3,949,817 to Rice which discloses an extensible handle for supporting a chainsaw, and U.S. Pat. No. 2,832,136 which discloses a mechanism for operating a chain cutting mechanism from a rotary power mower.

SUMMARY OF THE INVENTION

This invention is directed to garden power tools and especially hedge trimmers having supplemental handle mounting assemblies which are either integrally formed with or are securely attachable to the motor housings of such tools and which assemblies include one or more supports which are selectively engageable or connected to elongated handles so that the tools may be operated at extended distances while being supported at various cutting angles with respect to the operation. The supplemental handle mounting assemblies preferrably include at least two spaced elongated handle supports which are oriented in different directions with respect to the motor housing of the power tools so that the elongated handles may be selectively attached thereto in order to selectively adjust the angle at which the tools are disposed with respect thereto. In one embodiment of the invention, the handle supports are integrally formed with the motor housing while in another embodiment, the handle supports are carried on a mounting frame which is clampingly engaged about the motor housing of the hedge trimmer or other tool so as to compressively support the motor housing from at least two opposing sides thereof. In some instances, the mounting frames and the handles may be integrally formed so that a particular handle may be utilized to orient a hedge trimmer or other tool at a specified orientation with respect to the operator to permit the use of the power tool at either predetermined elevated or lateral positions.

It is a primary object of the present invention to provide elongated handles for use with such power tools as hedge trimmers wherein the motor housings of the hedge trimmers are provided with either integrally formed or rearwardly secured mounting assemblies which include at least two handle engaging members so that the elongated handles may be selectively secured to one of said handle engaging members.

It is an object of one embodiment of the present invention to provide motor housings for electrical or gasoline operated hedge trimmers which include at least two integrally formed supports that extend outwardly therefrom in different directions and which supports are selectively used to attach elongated handles to the hedge trimmers so that the hedge trimmers may be utilized at varying angles or positions with respect to an operator.

It is also an object of another embodiment of the present invention to provide elongated handles for hedge trimmers wherein the handles are selectively secured in various relationships with respect to the hedge trimmers by utilizing removable mounting bracket assemblies which securely and clampingly engage the motor housing of the hedge trimmers.

It is another object of the present invention to provide safety extension handles for hedge trimmers wherein the handles will permit the operator of the trimmers to be spaced remotely from the cutting blades and allow the operator to have complete and secure control over the operation of the power tool by providing a secure engagement between the elongated handle and the power tool at a point which will reduce unwanted vibration between the handle and the power tool during use.

It is a further object of the present invention to provide elongated handles for hedge trimmers wherein the connection between the handles and the tools are secure so that any accidental displacement of the power tool relative the handle during use is prevented.

It is yet another object of the present invention to provide elongated or extension handles for use with power operated lawn and garden tools and especially hedge trimmers wherein the handles are securely mounted to the motor housings of such tools and wherein the handles may be selectively attached to such housings at various selected angles so that the relative displacement of the cutting elements of such tools with respect to the operator may be selectively determined and securely maintained during the operation of the power tools.

It is also an object of the present invention to provide elongated handles for use with hedge trimmers wherein the handles may be formed or constructed so as to be easily and securely attached to conventional hedge trimmers thereby enabling such trimmers to be more safely used and operated even at elevated or extended positions.

BRIEF DESCRIPTION OF THE DRAWINGS

FIG. 1 is an illustrational perspective view showing one embodiment of the present invention wherein the elongated handle is attached to a conventional hedge trimmer so that the hedge trimmer is oriented to cut vegetation above the height of the operator.

FIG. 2 is an illustrational view of the hedge trimmer and elongated handle of FIG. 1 showing an alternate attachment of the handle to the mounting assembly which engages the hedge trimmers and wherein the hedge trimmer is oriented outwardly at an angle with respect to the handle to permit the operation of the hedge trimmer laterally or sideways of the operator.

FIG. 3 is a cross sectional view taken along line 3—3 of FIG. 1.

FIG. 4 is an assembly view of the embodiment of FIG. 1 showing the supplemental handle mounting assembly as it engages the motor housing of the hedge trimmers.

FIG. 5 is a perspective view of an anti-vibration pad which is utilized to line the inner portion of the mounting assembly shown in FIG. 4 so as to reduce unwanted vibration between the motor housing and the elongated handle of the present invention.

FIG. 6 is a partial cross sectional view taken along line 6—6 of FIG. 3.

FIG. 7 is an illustrational assembly view showing a second embodiment of the supplemental handle mounting assembly for use with the extension handle of the present invention.

FIG. 8 is an illustrational perspective view of another embodiment of the present invention wherein the supplemental elongated handle mounting assembly is integrally formed with the motor housing of the hedge trimmers showing the elongated handle mounted in a first position.

FIG. 9 is an illustrational perspective view of the embodiment of the invention shown in FIG. 8 with the supplemental handle being attached in a second position.

FIG. 10 is a side plan view of the motor housing and handle mounting assembly of FIG. 8.

FIG. 11 is an enlarged cross-sectional view of one of the supplemental handle mounting pins shown in FIG. 10.

DESCRIPTION OF THE PREFERRED EMBODIMENT

With continued reference to the drawings, the extension or supplemental elongated handle assembly 10 of the present invention is shown as being mounted to one form of conventional lawn and garden power hedge trimmer 12. The trimmer 12 includes elongated reciprocating cutting blades 13 which are driven by an electric motor (not shown) which is mounted within a motor housing 14. The hedge trimmer is controlled by an on/off switch 15 which is mounted along a shortened handle 16. The power cord 17 to the electric motor is shown as being disposed through the handle 16 and rearwardly thereof.

The hedge trimmer motor housing 14 includes an upper wall 18, lower wall 19, front and rear walls 20 and 21 and side walls 22 and 23. Generally, the motor housing is molded from a plastic material with the motor housing being at least partially integrally formed with portions of the handle 16. In this manner, such housings are frequently molded into left and right hand sections which split the front and rear walls 20 and 21, upper and lower walls 18 and 19 and handle 16 into two parts which are joined by suitable fasteners (not shown) along the longitudinal axis of the tool. Therefore, the lower wall 19 of the motor housing may be integrally formed with the lower portions 24 of the handle 16. Likewise, the rear wall 21 of the motor housing may be integrally connected to the upper portions 25 of the handle 16 through a tapered neck portion 26.

During normal use of the conventional hedge trimmers, a short secondary handle (not shown) may be attached to one or both of the side walls 22 and 23. Such secondary handle is attached to the housing by way of threaded bolts or studs 27 which extend outwardly from the sides of the housing. Whether or not the secondary handles are attached to one or both of the studs 27, it is apparent that the secondary handles are normally placed in extremely close proximity to the hedge trimmer cutting blades 13. Also, as shown in FIG. 3, vent openings 28 are provided through portions of the side walls 22 or 23 in order to provide air circulation to the motor.

As previously discussed, the extension or supplemental elongated handle assemblies of the present invention are designed and constructed in such a manner so as to provide the operators of powered hedge trimmers with a safe and secure structure which will permit the use of such trimmers to cut or trim hard to reach areas while insuring that the trimmers will not break loose or free or otherwise be reoriented with respect to the handles during use. Further, the extension handle assemblies are designed so as to permit selective alignment of the cutting blades of the trimmer tools relative to the operator so that various cutting angles are achieved.

In order to accomplish the foregoing, the extension handle assembly 10 includes a supplemental handle mounting portion 30 and an elongated outwardly extending handle portion 32. In the embodiments of the invention shown in FIGS. 1-7, the mounting portion 30 of the extension handle assembly 10 is removably secured or attached to the motor housing of the hedge trimmer. In these embodiments, the mounting portion includes an upper frame 31 for engaging at least two opposing or oppositely oriented walls or surfaces of the motor housing 14. With specific reference to FIGS. 3 and 4, a first form of the mounting portion of the extension handle assmebly 10 is shown. In this embodiment, the upper frame 31 includes an upper wall 33, front and rear walls 34 and 35, and side walls 36 and 37.

As shown in the drawings, the upper frame is molded or shaped to as to be cooperatively seated in overlaying engagement with the motor housing 14 of the hedge trimmer 12. To secure the upper mounting frame 31 of the mounting portion of the extension handle assembly to the motor housing, a base plate 38 is provided which extends along and in substantial abutting relationship with the lower wall 19 of the motor housing 14. The base plate is secured to two pair of flanges 39 and 40 which extend outwardly from the lowermost portions of each of the side walls 36 and 37 of the mounting frame 31 by bolts 41 which extend through aligned openings 42 and 43 and which are engaged by nuts 44. Other suitable locking or fastening members could be utilized to join the base plate 38 to the upper mounting frame 31.

As previously discussed, the upper frame 31 is cooperatively positioned over the motor housing 14 and therefore various openings are provided in the front, rear and side walls of the frame thereby providing clearance for the various components of the trimmer 12. An elongated narrow slot or opening 46 is provided adjacent the lower edge of the front wall 34 of the housing thereby providing clearance for the cutting blades 13. Elongated generally rectilinear openings 48 and 49 are provided in the side walls 36 and 37, respectively, and thereby provide clearance for conventional the handle mounting bolts 27 and the air vent openings 28 to the motor. The rear wall 35 of the frame 31 has a curved opening 50 therein which cooperatively fits or conforms to the neck portion 26 between the trimmer motor housing 14 and handle 16.

To reduce vibration and thereby make the extension handle assembly 10 of the present invention more comfortable to use and easier to handle and manipulate, one or more vibration damping pads 52 may be provided along the inside of the frame 31 so as to be positioned between the outer walls of the motor housing 14 and the walls of the extension handle mounting portion 30. One such pad 52 is shown in FIG. 5 as being of a shape to be cooperatively received between the rear wall 21 of the motor housing and the rear wall 35 of the upper mounting frame. Similar pads could be used between other opposing surfaces to further reduce noise and vibrations.

As previously discussed, the extension handle assembly 10 also includes an elongated handle 32 which has a forward or mounting end portion 56 and a remote or operator end portion 57. The ends of the handle 32 are integrally connected by a curved section 58 so that the mounting end is oriented at an angle of between approximately 45° to 90° with respect to the operator end thereof. The length of the handle 32 may vary or portions thereof could be made telescopic or extendable, however, it is proposed that the handle be from six (6) to eight (8) feet in length from end to end.

To increase the ease of operational control and handling of a power trimmer carried by the extension handle assembly 10 of the present invention, an enlarged generally rectangular supplemental handle 60 is rigidly secured to a portion of the elongated handle 32 at a point spaced from the operator end thereof. The supplemental handle could be adjustably positioned with suitable locking means extending through the elongated handle so as to insure the supplemental handle can not accidentally be displaced with respect thereto. A hand grip 62 is positioned over the end 57 of the handle 32 to provide for a second point of manual engagement to control the operation of a tool carried by the extension handle assembly.

Although the elongated handle 32 may be integrally formed with the upper mounting frame 31 of the mounting portion 30, it is preferred that the handle be adjustably secured to the frame 31 so that a variety of angular alignments may be obtained between the handle 32 and the power tool. In this regard, and in an effort to make the connections between the handle 32 and the mounting frame 31 more secure and yet versatile, two or more mounting rods or pins 64 and 65 are fixedly secured to the housing frame 31 and extend outwardly therefrom in a direction opposite to the orientation of the cutting blades. The mounting pins 64 and 65 are preferrably outwardly oriented from different positions with respect to one another so that when the mounting end 56 of the handle 32 is selectively connected thereto, the mounting relationship will cause the cutting blades 13 of the power trimmers 12 to be disposed in different angles with respect to the operator.

As shown in the drawings, mounting pin 64 is secured through a reinforcing plate 66 to the upper surface or wall 33 of the mounting frame 31 while mounting pin 65 is secured through a reinforcing plate 67 to the rear surface or wall 35 of the housing frame. The mounting pin 64 is shown as being upwardly vertically oriented at an angle with respect to mounting pin 65. If desired, the mounting pins may be integrally formed or molded with the mounting frame 31.

Although the handle 32 may be secured to the pins 64 and 65 in any number of ways, as shown, the mounting end portion 56 of the handle is hollow and is of a diameter to permit the handle to be selectively and slidingly engaged over the pins 64 and 65. Pairs of aligned openings 68 and 69 are provided through the pins and mounting end 56 of the handle through which a cotter pin 70 or other locking mechnism or fastener may be inserted. It should be noted that a plurality of openings 69 could be made through the pins 64 and 65 at varying positions around the circumference thereof so that the angled or pitched relationship between the handle 32 and trimmer 12 can be further adjusted.

With particular reference to FIG. 7 of the drawings, a second form or embodiment of the invention utilizing a detachable handle mounting frame is disclosed in detail. In this embodiment, the elongated handle 32 and related components would remain the same as with respect to FIGS. 1-6, however, the mounting frame 31 differs in structure. In this embodiment, the mounting frame 31' is simplified and is designed to engage the side walls 22 and 23 of the motor housing 14 of the hedge trimmers 12 therebetween. The frame 31' includes a somewhat T-shaped upper wall 80 which is integrally joined to a downwardly extending rear wall 81 and side walls 82. The side walls include openings 83 for selectively receiving the mounting bolts 27 of the trimmer secondary handle and are secured thereto by lock nuts 84. The lock nuts, when tightened, will urge the side walls 82 into compressed engagement with the oppositely oriented side walls 22 and 23 of the motor housing 14.

As with the preferred embodiment, the housing 31' includes a pair of spaced mounting rods or pins 85 and 86 which extend from the upper wall 80 and rear wall 81 thereof. The pins 85 and 86 are joined or connected to the elongated handle in the same manner as described above with respect to the embodiment of FIGS. 1-5 and as shown in FIG. 6. As the structural components of frame 31' are fewer than that of frame 31, a reinforcing flange 90 is integrally formed and extends outwardly along the upper wall 80 and rear wall 81 and connects the pins 85 and 86 thereby also strengthening the pins.

The extension handle assembly 10 of the present invention is preferrably constructed of a light weight and yet durable material such as an aluminum or a fiber reinforced plastic material. In some instances, it may be preferrable to form the handle mounting portion 30 of a molded plastic material and the elongated handle portion 32 of an aluminum material so that the handle is not only light weight but is strong enough to support even the largest conventional hedge trimmers in suspended relationship from one end thereof.

As previously discussed, the extension handle assembly of the present invention offers the advantage to an operator of allowing the cutting blades of a conventional hedge trimmer to be securely suspended or oriented at the various angled relationships both with regard to the area to be cut or trimmed and the position of the operator. In the event the operator wishes to cut elevated areas such as high hedge rows, then the elongated handle 32 may be selectively secured to pin member 65 (or 86) so that the resultant orientation of the hedge trimmer will allow the cutting blades to be in a generally horizontal plane when held outwardly in a position above the operator's head. In a like manner, in the event the operator wishes to utilize the hedge trimmers to cut generally vertical areas of a hedge row or other foliage, then the elongated handle 32 may be selectively connected to pin member 64 (or 85) so that the resultant orientation of the hedge trimmer blades will make it easy for such vertical trimmings to be made by the operator.

As previously noted, additional openings can be made through the mounting pin members 64 and 65 (or 85 and 86) to thereby allow even additional angular adjustment of the trimmer blades with respect to the elongated handle of the extension handle assembly.

With reference to FIGS. 8–11, yet another embodiment of the invention is shown in greater detail. In this embodiment, the handle mounting portion 30 is integrally formed with the motor housing of the hedge trimmers. In this manner, the hedge trimmers 112 have cutters 113 driven by a motor mounted within a motor housing 114. The motor housing is molded from a plastic material and may be divided into interconnecting sides or halves and has an upper wall 118, lower wall 119, front and rear walls 120 and 121 and side walls 122 and 123. A first shortened handle 116 may be integrally formed with and extend from the rear wall of the housing. A secondary C-shaped handle 125 may also be provided and which is attached at each of its ends to the side walls 122 and 123 of the motor housing.

The handle mounting portion 30 of the present embodiment is shown as being molded with the upper and rear walls of the motor housing so as to provide a pair of spaced and outwardly extending mounting pins, rods or shafts 130 and 131. The base portions 132 and 133 of each of the mounting pins may be reinforced or enlarged in order to provide increased strength at the point of the junction between the mounting pins and upper and rear walls. Although the elongated handle 32 may be selectively attached to the mounting pins 130 and 131 in a manner similar to that discussed above with respect to the other embodiments of the invention, a modified connection is shown in FIG. 11. In this embodiment, the mounting end portion 56 of the handle 32 is provided with one or more openings 140 which are engageable by a ball detent mechanism 142 carried with the mounting pins 130 and 131. The detents are spring loaded, as at 143, so as to insure that the balls 144 are positively locked within the openings 140 when the elongated handle and pins are properly aligned.

As with the prior embodiment, the mounting pins are preferably oriented in differently outwardly extending directions with respect to one another with the particular alignment shown allowing for the trimmers to be oriented in an elevated horizontal plane when the handle 32 is attached to mounting pin 131 and oriented into an extended vertical plane when connected to pin 130. Additional pins could also be provided in order to permit additional alignments to be created between the hedge trimmer and the supplemental elongated handle.

I claim:

1. A powered hedge trimmer apparatus comprising cutting blades driven by a motor mounted within a motor housing, said motor housing having oppositely oriented upper and lower, front and rear and spaced side wall portion, at least two elongated handle mounting means, each of said elongated handle mounting means being disposed along different one of said wall portions of said housing so as to be oriented outwardly of said housing in different alignment, an elongated handle means, said elongated handle means having first and second ends and an intermediate portion, said intermediate portions being generally curved so that said first and second ends of said handle means are angularly oriented with respect to one another, and means for selectively connecting said first end of said elongated handle means to either of said elongated handle mounting means so that said motor housing is supported by said elongated handle means.

2. The powered hedge trimmer apparatus of claim 1 in which said elongated handle mounting means includes outwardly extending pin means which are integrally formed with said motor housing, said first end of said handle means being removably connected to said pin means.

3. The powered hedge trimmer apparatus of claim 2 in which said elongated handle mounting means are positioned along said upper and said rear wall portions of said motor housing.

4. The powered hedge trimmer apparatus of claim 3 in which said first and second ends of said elongated handle means are oriented at between approximately 45° to 90° with respect to one another.

5. The powered hedge trimmer apparatus of claim 1 wherein said elongated handle mounting means are carried by a mounting frame means, said mounting frame means having at least two opposing wall portions which are connected by an intermediate wall portion, and means for connecting said opposing wall portions of said mounting frame means in a secure clamping relationship with one of the pairs of oppositely oriented walls of the motor housing.

6. The powered hedge trimmer apparatus of claim 5 in which said intermediate portion of said elongated handle means is curved so that said first and second ends thereof are oriented at between approximately 45° to 90° with respect to one another.

7. The powered hedge trimmer apparatus of claim 6 in which said at least two elongated handle mounting means include first and second pin means extending outwardly from spaced portions of said mounting frame means.

8. The powered hedge trimmer apparatus of claim 7 in which said means for connecting said first end of said elongated handle means to said mounting frame means includes a locking member disposed through both said elongated handle means and one of said pin means so that said handle means cannot be rotated relative to said one of said pin means.

9. The powered hedge trimmer apparatus of claim 7 in which said mounting frame means includes a pair of side wall portions, a rear wall portion and an upper wall portion, said first pin means extending upwardly and outwardly from said upper wall portion and said second pin means extending outwardly from said rear wall portion.

10. The powered hedge trimmer apparatus of claim 9 in which said mounting frame means overlays the motor housing of the trimmer, said side wall portions being adjacent the side walls of the motor housing, said rear wall portion being adjacent the rear wall of the motor housing and said upper wall portion being adjacent the upper wall of the motor housing.

11. The powered hedge trimmer apparatus of claim 9 including vibration damping means positioned in contact between said mounting frame means and the motor housing.

12. The powered hedge trimmer apparatus of claim 9 including a reinforcing flange means extending along said upper wall portion and said rear wall portion of said mounting frame means, said flange means also connecting said first and second pin means.

13. The powered hedge trimmer apparatus of claim 7 in which said mounting frame means includes front and rear wall portions, side wall portions and upper and lower wall portions, said mounting frame means being in overlaying relationship with respect to the motor housing, a base plate member disposed below the lower wall of the motor housing, and means for connecting said base plate with said mounting frame means so as to clamp the motor housing therebetween.

14. The powered hedge trimmer apparatus of claim 13 including a vibration damping means positioned between said mounting frama means and the motor housing.

15. The powered hedge trimmer apparatus of claim 13 including an elongated opening in each of said side wall portions of said mounting frame means, a second elongated opening in said rear wall portion and a recessed opening in said front wall portion so that components of the trimmer may be extended through said openings in said wall portions of said mounting frame means.

16. The powered hedge trimmer apparatus of claim 7 including a supplemental handle means secured to said elongated handle means so as to be between said intermediate portion and said first end thereof.

17. An extension apparatus for use with a hedge trimmer wherein the hedge trimmer has a blade which is operated by a motor contained within a motor housing, wherein said extension apparatus comprises a mounting frame means for selectively engaging the motor housing of the hedge trimmer and an elongated handle means, said mounting frame means having wall portions which are cooperatively received in overlaying relationship with respect to the motor housing of the hedge trimmer, means for securing said wall portions in clamping relationship with respect to the motor housing of the hedge trimmer, said elongated handle means being removably mounted to said mounting frame means and having a second end for engaging said mounting frame means and a first end spaced remotely therefrom, an intermediate portion of said handle means being angulatly oriented to connect said first and second ends in an angular relationship of between 45° to 90° with respect to one another, said mounting frame means having first and second pin means mounted thereon and extending outwardly therefrom so as to be oriented in different directions with respect to said mounting frame means, and means for selectively mounting said second end of said elongated handle means to one of said pin means.

18. The extension apparatus of claim 17 in which said mounting frame means includes an upper wall portion, spaced side wall portions and front and rear wall portions which overlay the motor housing, said first and second pin means extending outwardly from two of said wall portions.

19. An extension apparatus for use with a conventional hedge trimmer having a cutting blade which is operated by a motor mounted within a motor housing comprising an elongated handle means and a mounting frame, said mounting frame having first and second portions for engaging the motor housing of the hedge trimmer on generally opposite sides thereof, means for securing said mounting frame means in overlaying relationship with respect to the motor housing, said mounting frame means having an upper wall portion and a rear wall portion and spaced side wall portions which are generally integrally connected, a first connecting pin extending from said upper surface of said mounting frame and a second connecting pin extending from said rear surface of said mounting frame, said elongated handle means having one end portion for selectively mounting to one of said first and second connecting pins, said elongated handle portion having another end portion extending outwardly of said one end portion thereof, and means for securing said one end portion of said elongated handle means to one of said first and second connecting pins.

20. The extension apparatus of claim 19 including a base plate means, means for securing said base plate means to said side wall portions of said mounting frame, and vibration damping mean intermediate said mounting frame and the motor housing.

* * * * *